Figure 1:
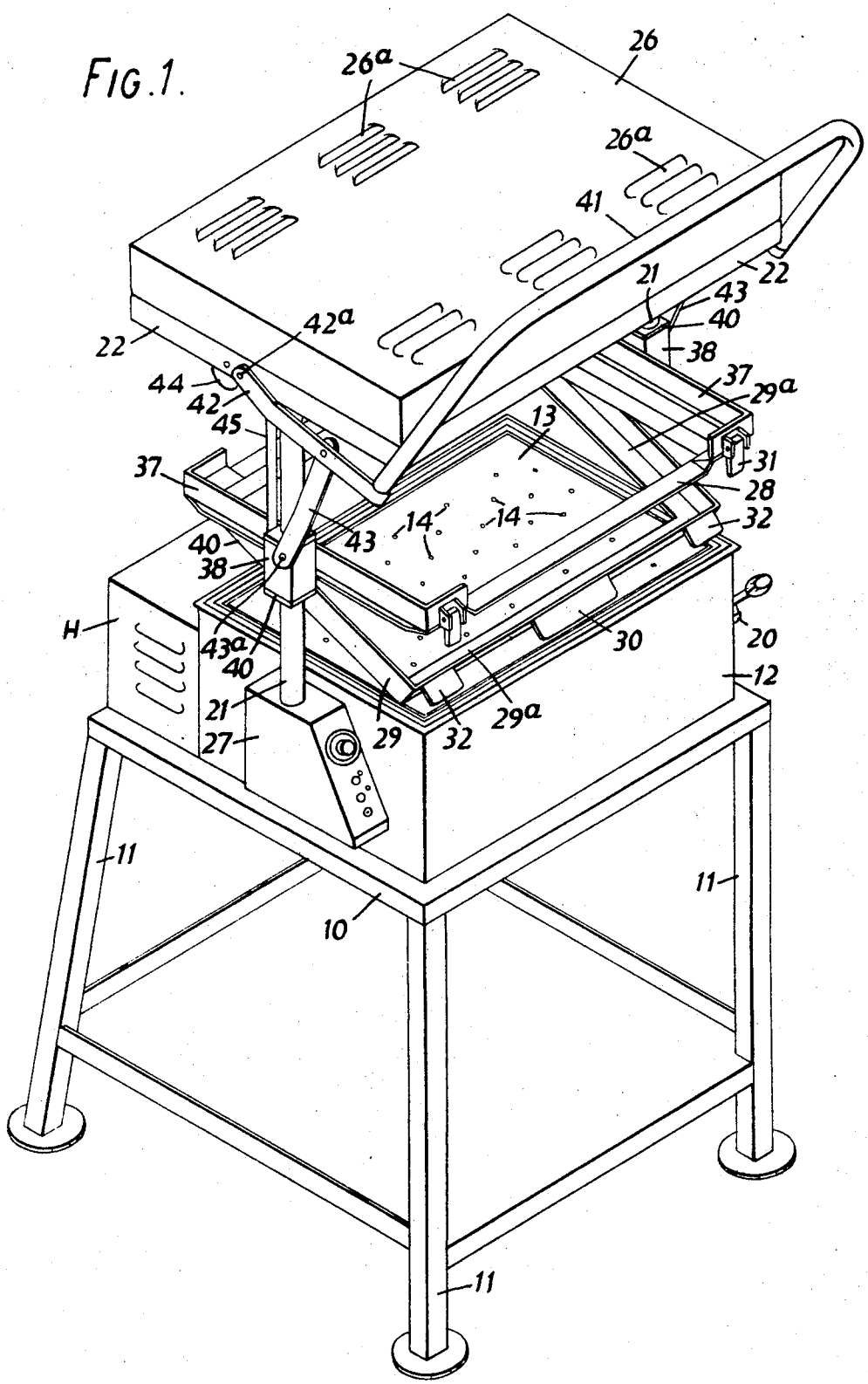

United States Patent [19]
Hepworth

[11] 3,751,208
[45] Aug. 7, 1973

[54] VACUUM FORMING MACHINE

[75] Inventor: Paul Steabben Hepworth, Leicester, England

[73] Assignee: H. Upchurch & Co., Limited, Leicester, England

[22] Filed: June 21, 1971

[21] Appl. No.: 154,886

[30] Foreign Application Priority Data
June 20, 1970 Great Britain.................. 30,051/70

[52] U.S. Cl. .............................................. 425/388
[51] Int. Cl. ........................................... B29c 17/04
[58] Field of Search................... 425/158, 388, 292, 425/DIG. 60

[56] References Cited
UNITED STATES PATENTS

| | | | |
|---|---|---|---|
| 3,553,784 | 1/1971 | Shuman ............................. | 425/158 |
| 2,976,658 | 3/1961 | Kostur ................................ | 53/112 |
| 3,025,566 | 3/1962 | Kostur ................................ | 425/388 |
| 3,133,314 | 5/1964 | Arnould et al..................... | 425/388 |
| 3,193,881 | 7/1965 | Kostur .............................. | 425/292 |

*Primary Examiner*—Robert L. Spicer, Jr.
*Attorney*—Holman & Stern

[57] ABSTRACT

A machine for vacuum forming plastics sheets has a perforated mould platform above a vacuum reservoir. A valve is operable to place the holes in the platform in communication with the reservoir. Heating means are located above the platform. A carrier frame is movable up and down between the heating means and the mould platform. This frame carries at its underside a clamping frame to receive a plastics sheet. The clamping frame, which is at least partially separable from the carrier frame, is clampable to the latter by adjustable toggle clamps. The carrier frame is movable by a handle first upwards to present a sheet to the heating means and then downwards to clamp the clamping frame in an airtight manner upon the platform with the softened sheet drawn in an airtight manner over a mould.

6 Claims, 5 Drawing Figures

VACUUM FORMING MACHINE

This invention relates to a machine for vacuum forming sheet plastics materials.

In particular, the invention has reference to such a machine of the kind wherein a sheet of plastics material is formed into the shape of a mould by applying vacuum to a support on which the mould is located.

The object of the present invention is to provide a generally improved machine of this kind which, besides being comparatively small, simple in construction and operation and completely self-contained and thereby portable, has the advantage that the insertion and removal of a sheet of plastics material thereinto and therefrom can be performed easily and quickly.

Broadly considered, the improved vacuum forming machine according to this invention comprises, in combination, a perforated mould platform or table for supporting at least one mould at a time; means operable to apply vacuum to the said platform or table; heating means remotely spaced above the mould platform or table; a carrier frame which carries beneath it a wholly or partially removable clamping frame for supporting a sheet of plastics material; means for securing the two frames together with a sheet interposed between them; and means for moving the carrier frame heightwise between a position in which the sheet is presented to the heating means for softening thereof and a position in which the sheet in the clamping frame is clamped by the carrier frame over the mould or moulds on the supporting platform or table in an air-tight fashion in readiness for the application of vacuum as aforesaid to form the sheet into the shape(s) of the mould(s).

Conveniently, a vacuum tank or reservoir is provided beneath the perforated mould platform or table, this reservoir being arranged to be placed in communication with the holes in the platform or table via a manually operable valve.

The means for applying a vacuum may include an electrically operated vacuum pump which is appropriately associated with the vacuum reservoir.

Figure 2:
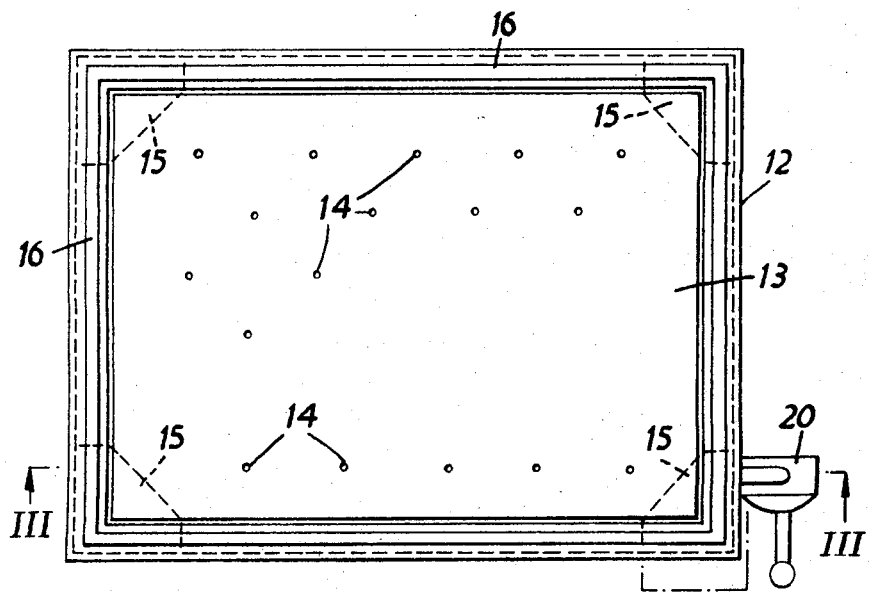
Figure 3:
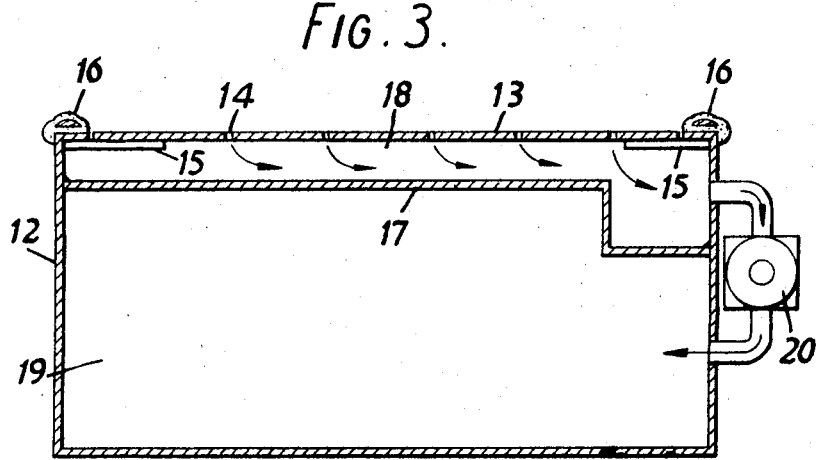
Figure 4:
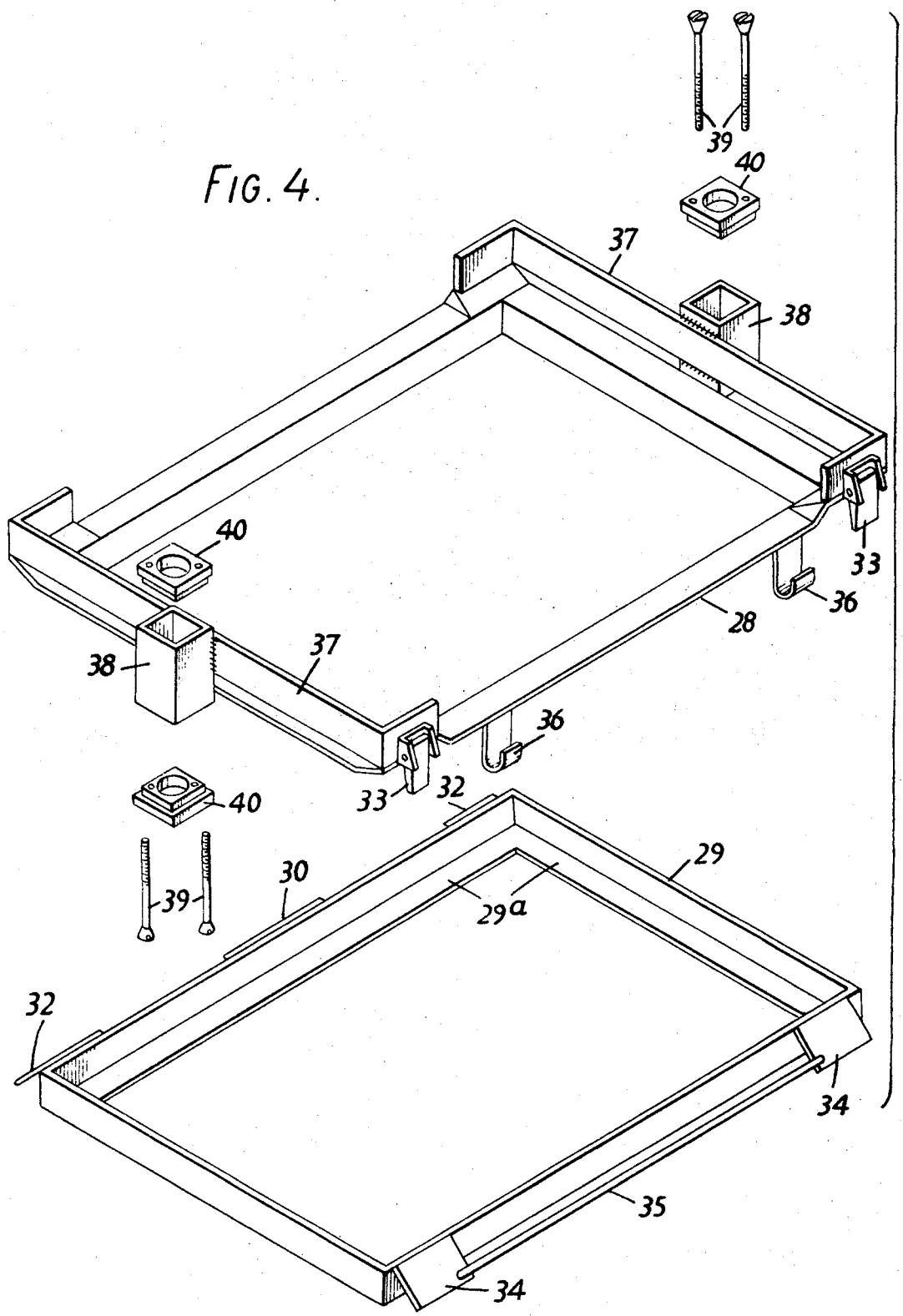
Figure 5:
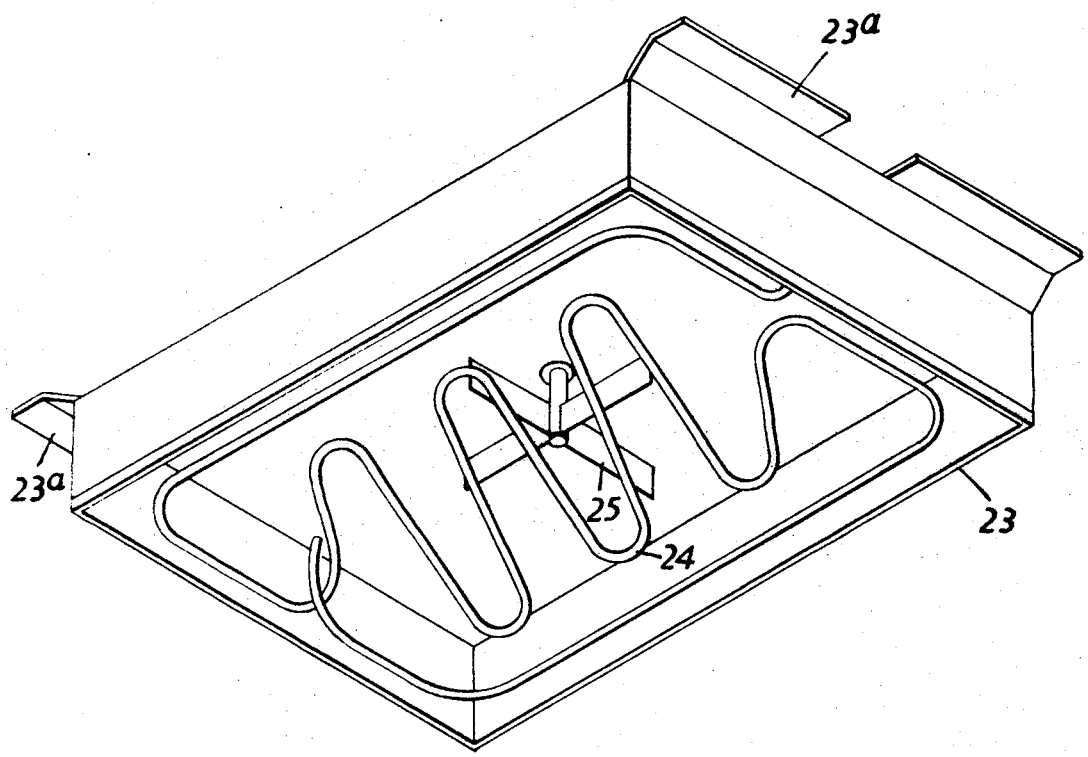

In order that the invention may be more clearly understood and readily carried into practical effect, a specific constructional example of the improved vacuum forming machine will now be described with reference to the accompanying drawings, wherein, FIG. 1 is a general perspective view of the machine, as seen from the front and the left-hand side, FIG. 2 is a plan view of the vacuum reservoir and the perforated mould platform or table, FIG. 3 is a vertical sectional view of the same taken on the line III — III of FIG. 2, FIG. 4 is an 'exploded' rear perspective view illustrating the vertically movable carrier frame, including the bearing blocks and the collars of the same, together with the hinged clamping frame, and FIG. 5 is a perspective view from below of the electrical heating element and the casing which encases it and forms a shroud therefor.

Like parts are designated by similar reference characters throughout the drawing.

Referring to FIG. 1, it will be seen that the illustrated machine, which is portable, is supported as a whole upon a comparatively low table 10 furnished with legs 11.

The base of the vacuum forming machine which sits upon the table is constituted by a hollow box-like tank 12 of rectangular shape designed to provide a vacuum reservoir. At the back of the latter is provided a housing H for an electrically operated vacuum pump (not shown). This pump, when switched on and running, draws air from the reservoir 12.

The upper end of the reservoir 12 is completely covered by a flat, horizontally disposed mould platform or table 13 for supporting at least one mould at a time. As shown in FIG. 2, the said platform or table 13, which is perforated by relatively staggered rows of small holes 14, is itself supported upon gussets 15 welded into the corners of the vacuum reservoir. Seating upon the peripheral margins of the perforated mould platform or table 13, right around the latter is a resilient edge seal 16.

As depicted in FIG. 3, there is provided within the vacuum reservoir 12, below the mould platform or table 13, a mainly horizontal partition 17 which, as shown in FIG. 3, provides a closed compartment 18 of comparatively shallow depth. Beneath the compartment 18 is another and deeper closed compartment 19 which is in communication with the aforementioned vacuum pump. At 20 is indicated a valve which may conveniently have associated with it a vacuum gauge. Accordingly, with the vacuum pump switched on and running, and assuming a sheet of plastics material to be clamped down over a mould on the platform or table 13 in an air-tight fashion made possible by the provision of the edge seal 16, as will be hereinafter described, air will be extracted from the closed compartment 18 (see the arrows in FIG. 3) in such a way as to apply a vacuum to the said platform or table.

Arranged to straddle both the vacuum reservoir 12, and hence also the perforated mould platform or table 13 carried thereby, are two fixed vertical pillars 21 each of which is disposed centrally of the relevant end of the reservoir. To the upper ends of these pillars 21, only one of which, i.e., that at the left-hand side of the machine, is fully shown, is secured a fixed rectangular mounting frame 22 disposed in a horizontal plane well above the mould platform or table 13.

Fitted within and rigidly secured to the fixed mounting frame 22, is a comparatively shallow casing 23 which, as shown in FIG. 5, is wholly closed at the top but wholly open at the bottom — like an inverted tray. This casing 23 encases a conventional electrical heating element 24, the surrounding and depending walls of the said casing functioning as an element reflector and shroud. The heater casing 23 has centrally mounted therein a motor-driven rotary paddle fan 25 arranged to distribute the heated air and thereby even out the heating effect. The upper margins of the ends of the heater casing 23, which can be said to be indirectly supported from the pillars 21, are extended upwardly and turned over and outwardly to provide lateral flanges 23a for the support of a protective heat-insulating cover 26. This cover, formed with air-louvres 26a, surmounts and is congruent with the fixed mounting frame 22.

At the lower end of the left-hand pillar 21 and adjoining the corresponding end of the vacuum reservoir 12 is a control box 27 incorporating a control for the heating element 24 and electrical switches for the vacuum pump, and the motorised paddle fan 25.

For vertical movement upwardly and downwardly, guided by the two vertical guide pillars 21, is a rigid, rectangular carrier frame 28. To the back of this frame 28 is hingedly connected a partially removable clamping frame 29 having, as shown in FIGS. 1 and 4, inwardly directed flanges 29a for the support of a sheet of plastics material. When such a sheet is in position, the clamping frame 29 can be swung upwardly by taking between thumb and fingers and lifting a tab 30 provided centrally at the front of the same frame. By swinging it up in this way, the clamping frame 29 is closed up flat against the underside of the carrier frame 28, with the sheet interposed between the two frames, whereupon the latter are firmly secured together by means of two pairs of adjustable toggle clamps. Thus, in the illustrated example, two toggle clamps 31 provided at the front of the carrier frame 28 are arranged for locking interengagement with fixed outwardly inclined tabs 30 provided on the front of the clamping frame 29 at opposite sides of the lifting tab 30 (see FIG. 1). Similarly, two further adjustable toggle clamps 33 provided at the back of the carrier frame 28 are arranged for interengagement with fixed outwardly inclined tabs 34 provided at the back of the clamping frame 29 (see FIG. 4). The two widely spaced tabs 34 provide supports for the opposite ends of a straight suspension rod 35 which functions as a hinge pin for seating in a pair of hooks 36 depending from the back of the carrier frame 28. The construction and arrangement are, therefore, such that by releasing all four adjustable toggle clamps 31, 31 and 33, 33, the clamping frame 29 can be allowed to swing downwardly about the rod 35 thereby partially removing this frame from the carrier frame 28 above it and so permitting easy removal of an already vacuum formed sheet and insertion into the machine of a fresh sheet for vacuum forming.

The opposite ends of the carrier frame 28 are in part constituted by integral, horizontally disposed load-spreading bars 37 the purpose of which will be hereinafter described. Attached to the outer side of each such load-spreading bar 37, at a location midway between its ends, is a collar 38 of square cross-section. The fixed vertical guide pillars 21 extend freely through these two collars. Secured, by means of screws 39, to the upper and lower ends of each collar 38 are co-axial bearing blocks 40 which are bored to be a sliding fit on the relevant vertical guide pillar 21.

For raising and lowering the vertically movable carrier frame 28, together with the clamping frame 29 secured to the underside thereof, and for forcing the clamping frame down at appropriate times into airtight engagement with the resilient edge seal 16 surrounding the mould platform or table 13, there is provided a handle 41. This handle is arranged to actuate operating levers 42 and toggle links 43 pivotally connected thereto. The inner ends of the operating levers 42 are pivoted at 42a to the ends of the fixed mounting frame 22, whereas the lower ends of the toggle links 43 are pivoted at 43a to the collars 38.

The aforementioned load-spreading bars 37 are so designed as to ensure that the downward clamping pressure applied by the toggle linkages through the collars 38 to the carrier frame 28 is evenly distributed and concentrated at the corners of the latter.

Counter-balancing biassing means of any appropriate character are provided for urging the vertically movable carrier frame 28 upwardly. These means in the example illustrated, comprise spring reels 44 of steel tape 45 carried by the fixed mounting frame 22, the lower free ends of the lengths of such steel tape being connected to the collars 38. The spring reels 44 tend to wind up suchwise as to exert upward pulls on the collars 38.

The perforated mould platform or table 13, the carrier frame 28 and the clamping frame 29 are all rectangular in shape and of substantially the same size.

By means of the handle 41, the carrier frame 28, with the clamping frame 29 secured to its underside to hold a sheet of plastics material between the two frames, is first raised to a position in which the sheet is presented to the electrical heating means for softening and then lowered so that the clamping frame 29 is clamped down upon the edge seal 16 on the mould platform or table 13. At this stage the valve 20 is operated to apply vacuum to the platform or table 13 in the manner previously explained herein with the result that the softened plastics sheet is vacuum formed over and around the mould or moulds on the platform or table.

The clamping frame 29 may alternatively be completely removable from beneath the carrier frame 28. In any event, an advantage of the invention is that insertion and removal of a plastics sheet into and from the machine can be performed easily and quickly.

I claim:

1. Apparatus for vacuum-forming a sheet of heat-softenable plastic material to the shape of a mould on a support comprising, in combination:
   a perforated mould-platform for supporting mould means upon which a sheet of plastic material will be shaped;
   vacuum-reservoir means operatively connected to said mould-platform;
   means for selectively communicating said vacuum-reservoir means to said mould-platform to supply a forming-vacuum thereat to shape a conditioned sheet juxtaposed thereover;
   pump means operatively connected to said vacuum-reservoir means for maintaining a vacuum therein;
   fixed support means extending above said mould-platform;
   heating means connected to said support means and overlying said mould-platform in fixed relation thereto for conditioning a sheet of softenable plastic material exposed thereto;
   carrier-frame means displacable supported on said support means for traversing the space between said heating means and said mould-platform;
   clamping-frame means releasably supported on said carrier-frame means and including means for removably supporting a sheet of plastic in exposed relation when traversed between said heating means and mould-platform; and
   means for moving said carrier-frame and clamping-frame means through the space between said heating means and mould-platform for sequentially subjecting the sheet of plastic material to conditioning heat and a forming vacuum, said mould-platform including peripheral seal means confronting said carrier-frame and clamping-frame means for engagement thereby for substantially sealing the sheet of conditioned plastic material over said mould-platform and trapping a forming-vacuum thereat whereby the sheet of conditioned material is shaped according to said mould means;
   the improvement in which said support means comprises vertically extending guide pillars betwen said mould-platform and said heating means, said carrier-frame means including collars including bearing means telescopically received on said pillars for free vertical movement therealong in the space between said heating means and said mould-platform, handle means on said carrier frame for effecting the sequential conditioning and forming operations for clampingly engaging the clamping-frame and carrier-frame means onto said peripheral seal means, said handle means including lever portions pivotally connected to fixed pivot portions above said collers for effecting a mechanical advantage as said handle means is urged downwardly, toggle links pivotally connected between intermediate portions of said lever portions and said collars for forcibly urging said carrier-frame clamping-frame means onto said mould-platform, said carrier-frame means including load-distributing end frame portions connected to said collars for insuring that downward force applied by said toggle links will be distributed onto corresponding portions of said mould platform of said peripheral seal means onto which the carrier-frame and clamping-frame means are forcibly urged by said handle means.

2. Apparatus as claimed in claim 1 in which said mould-platform, carrier-frame and clamping-frame means are all rectangular in shape and of substantially the same peripheral size, said vertical guide pillars being disposed medially of the opposed ends of said mould platform and said vacuum-reservoir means, said vacuum-reservoir means being disposed beneath said mould-platform.

3. A vacuum forming machine according to claim 2, wherein the heating means comprise an electrical heating element which is encased within a casing open at the bottom and having a closed top surmounted by a protective heat-insulating cover, the said casing providing a heat-reflecting shroud for the heating element and being supported within a fixed mounting frame carried by and at the upper ends of the two vertical guide pillars.

4. Apparatus according to claim 2, wherein the clamping-frame means is hingedly connected along one side to the corresponding side of the carrier-frame means and is thus adapted to be turned upwardly at its other side to fit flat against the underside of the carrier-frame means, with a plastics sheet held betwen the two means, and adjustable toggle clamps are provided to secure these means together in readiness for upward and downward movements thereof as a unit.

5. A vacuum forming machine according to claim 3, wherein the casing of the electrical heating element has mounted therein an electrically driven paddle fan arranged to distribute the heated air and thereby even out the heating effect.

6. A vacuum forming machine according to claim 1, wherein spring means are provided for urging the vertically movable carrier-frame means upwards, said spring means comprising at least one spring reel of tape carried by a fixed part at the upper ends of one vertical guide pillar, the free ends of the tape being connected to one collar and the reel tending to wind up suchwise as to exert upward pulls on the collar.

* * * * *